United States Patent
Feng et al.

(10) Patent No.: US 10,432,490 B2
(45) Date of Patent: Oct. 1, 2019

(54) MONITORING SINGLE CONTENT PAGE APPLICATION TRANSITIONS

(71) Applicant: AppDynamics LLC, San Francisco, CA (US)

(72) Inventors: Zhichun Feng, Foster City, CA (US); Jia Xu, San Rafael, CA (US); Binil Thomas, Walnut Creek, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 14/815,205

(22) Filed: Jul. 31, 2015

(65) Prior Publication Data
US 2017/0034030 A1    Feb. 2, 2017

(51) Int. Cl.
*H04L 12/26*    (2006.01)
*H04L 29/08*    (2006.01)

(52) U.S. Cl.
CPC .......... *H04L 43/0876* (2013.01); *H04L 67/02* (2013.01)

(58) Field of Classification Search
CPC .............................. H04L 43/0876; H04L 67/02
USPC ........................................ 709/226, 232, 224
See application file for complete search history.

(56) References Cited

U.S. PATENT DOCUMENTS

| | | | | |
|---|---|---|---|---|
| 7,116,682 B1* | 10/2006 | Waclawsky | ........... | H04J 3/1682 370/468 |
| 7,523,158 B1* | 4/2009 | Nickerson | ............. | G06F 16/958 709/203 |
| 7,558,865 B2* | 7/2009 | Lin | ........................ | G06Q 10/04 709/229 |
| 7,975,020 B1* | 7/2011 | Green | ................ | G06Q 30/0241 705/14.4 |
| 8,719,255 B1* | 5/2014 | Pope | ................... | G06F 16/9535 707/716 |
| 9,299,030 B1* | 3/2016 | Hotchkies | ........... | G06F 16/9574 |
| 9,824,074 B2* | 11/2017 | Krassner | ............. | G06F 16/9577 |
| 2002/0035498 A1* | 3/2002 | Kehoe | ................. | G06F 11/2294 709/203 |
| 2002/0198984 A1* | 12/2002 | Goldstein | ............. | G06F 11/323 709/224 |
| 2002/0198985 A1* | 12/2002 | Fraenkel | ............. | G06F 11/3409 709/224 |
| 2008/0126967 A1* | 5/2008 | Lusen | ................... | G06F 3/0483 715/769 |
| 2008/0162453 A1* | 7/2008 | Liu | ........................ | G06F 16/951 |

(Continued)

*Primary Examiner* — David A Lazaro
*Assistant Examiner* — Berhanu Shitayewoldetadik
(74) *Attorney, Agent, or Firm* — Behmke Innovation Group LLC; James Behmke; Stephen D. LeBarron (57) ABSTRACT

A system monitors applications that provide a single content page by monitoring network traffic associated with single page transitions. The network traffic may be monitored by mechanisms provided by a network browser that updates the page. Updates to the page, called transitions, may be detected when they first begin. The network traffic associated with a single page transition from a first content page to a second version of that content page may be tracked through the network traffic viewing mechanism. When the network traffic is determined to have concluded, the end of the single content page transition is determined to have occurred. Metrics may then be generated from data collected during the transition, and the data and metrics may be reported to a controller.

18 Claims, 6 Drawing Sheets

(56) References Cited

U.S. PATENT DOCUMENTS

| | | | | |
|---|---|---|---|---|
| 2009/0083155 A1* | 3/2009 | Tudor | G06Q 10/06 | 705/14.69 |
| 2009/0106447 A1* | 4/2009 | Lection | H04L 67/02 | 709/236 |
| 2009/0198724 A1* | 8/2009 | Valimaki | G06F 16/958 | |
| 2009/0265390 A1* | 10/2009 | Asanuma | G06Q 10/06 | |
| 2009/0271514 A1* | 10/2009 | Thomas | G06F 11/3438 | 709/224 |
| 2010/0057840 A1* | 3/2010 | Schlusser | H04L 29/08846 | 709/203 |
| 2010/0088404 A1* | 4/2010 | Mani | G06F 15/173 | 709/224 |
| 2010/0088411 A1* | 4/2010 | Litofsky | H04L 43/0852 | 709/224 |
| 2010/0153544 A1* | 6/2010 | Krassner | G06F 16/9577 | 709/224 |
| 2010/0287346 A1* | 11/2010 | Schreter | G06F 12/023 | 711/162 |
| 2012/0221712 A1* | 8/2012 | Sullivan | G06F 11/3476 | 709/224 |
| 2012/0271941 A1* | 10/2012 | Mirandette | G06F 16/955 | 709/224 |
| 2013/0055070 A1* | 2/2013 | Sacks | G06F 21/53 | 715/234 |
| 2013/0097313 A1* | 4/2013 | Zhang | G06F 11/3419 | 709/224 |
| 2013/0198608 A1* | 8/2013 | Krassner | G06F 16/9577 | 715/234 |
| 2013/0246909 A1* | 9/2013 | Carroll | G06F 17/2247 | 715/235 |
| 2014/0181645 A1* | 6/2014 | Macbeth | G06F 3/04815 | 715/249 |
| 2014/0215316 A1* | 7/2014 | Guo | G06F 17/30876 | 715/241 |
| 2015/0007278 A1* | 1/2015 | Benezra | H04L 29/06 | 726/5 |
| 2015/0142953 A1* | 5/2015 | Bayen | H04L 67/22 | 709/224 |
| 2015/0278171 A1* | 10/2015 | Lefebvre | G06F 17/2247 | 715/760 |
| 2016/0048877 A1* | 2/2016 | Leung | G06Q 30/0267 | 705/14.51 |

* cited by examiner

MONITORING SINGLE CONTENT PAGE APPLICATION TRANSITIONS

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. These reports provide information regarding the performance of applications that provide a series of content pages which are often loaded, reloaded, and replaced.

Some applications within distributed transactions provide a content page as a single page only. Thus, as user clicks on the page and updates are required for the content page, no additional pages are loaded. Rather, portions of the single content page are updated as a transition within the already loaded page. Typically, this provides for quicker updates from the point of view of a user, but presents challenges when trying to monitor the application performance of the single page, as most content page metrics are based on the page completely reloading. What is needed is an improved system for monitoring applications that provide single content page transitions

SUMMARY

The present technology, roughly described, monitors applications that provide a single page by monitoring network traffic associated with single page transitions. The network traffic may be monitored, for example, by mechanisms provided by a network browser that updates the page. Updates to the page, called transitions, may be detected when they first begin. The network traffic associated with a single page transition from a first content page to a second version of that content page may be tracked through the network traffic viewing mechanism. When the network traffic is determined to have concluded, the end of the single content page transition is determined to have occurred. Metrics may then be generated from data collected during the transition, and the data and metrics may be reported to a controller. In addition to network traffic data associated with a single page transition, resources and other data may be collected regarding the transition to provide an indication of the performance associated with the single page transition.

An embodiment may include a method for monitoring a single content page application. An agent may detect, at a client device, a start of a page transition for a single content page provided by a remote application, the single content page application providing a single content page in a network browser and performing subsequent updates to the single content page without loading a new page. In response to detecting the start of the page transaction, the agent may monitor, at the client device, network activity associated with the page transition. The agent may detect, at the client device, the end of the page transition; determining by the agent at a client device metrics from the network activity monitoring. The agent may report the metrics to a remote server.

An embodiment may include a system for monitoring a single content page application. The system may include a processor, memory, and one or more modules stored in memory and executable by the processor. When executed, the modules may detect by an agent at the client device a start of a page transition for a single content page provided by a remote application, the single content page application providing a single content page in a network browser and performing subsequent updates to the single content page without loading a new page, in response to detecting the start of the page transaction, monitor by the agent at the client device network activity associated with the page transition, detect by the agent at the client device the end of the page transition, determine by the agent at a client device metrics from the network activity monitoring, and report by the agent at the client device the metrics to a remote server.

DETAILED DESCRIPTION

The present system monitors applications that provide a single content page by monitoring network traffic associated with single page transitions. The network traffic may be monitored, for example, by mechanisms provided by a network browser that updates the page. Updates to the page, called transitions, may be detected when they first begin. The network traffic associated with a single page transition from a first content page to a second version of that content page may be tracked through the network traffic viewing mechanism. When the network traffic is determined to have concluded, the end of the single content page transition is determined to have occurred. Metrics may then be generated from data collected during the transition, and the data and metrics may be reported to a controller. In addition to network traffic data associated with a single page transition, resources and other data may be collected regarding the transition to provide an indication of the performance associated with the single page transition.

Figure 1:
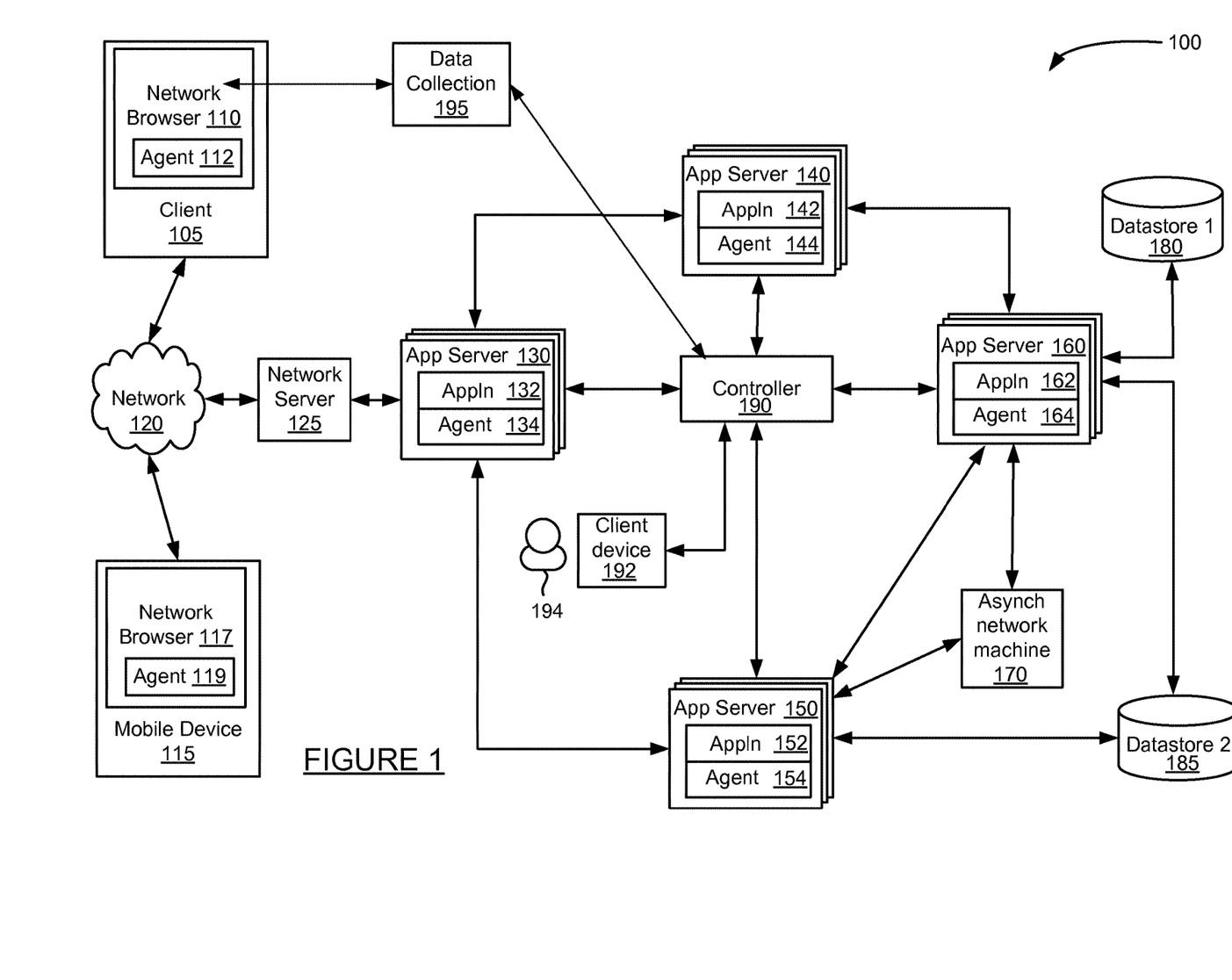
FIG. 1 illustrates a block diagram for monitoring an application that provides a single content page.

FIG. 1 illustrates a block diagram for monitoring an application that provides a single content page. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, as a JavaScript file included in the single page application, downloading the application to the server, or in some other manner. Agent 112 may be executed to monitor network browser 110, the operation system of client 105, user interactions with content pages and user activity at the client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as for example a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .NET, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular, each application may call any application or method of another host or virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data, machine monitoring data, and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g., a web page, which may be provided to and rendered through a network browser application on client device 192.

Figure 2:
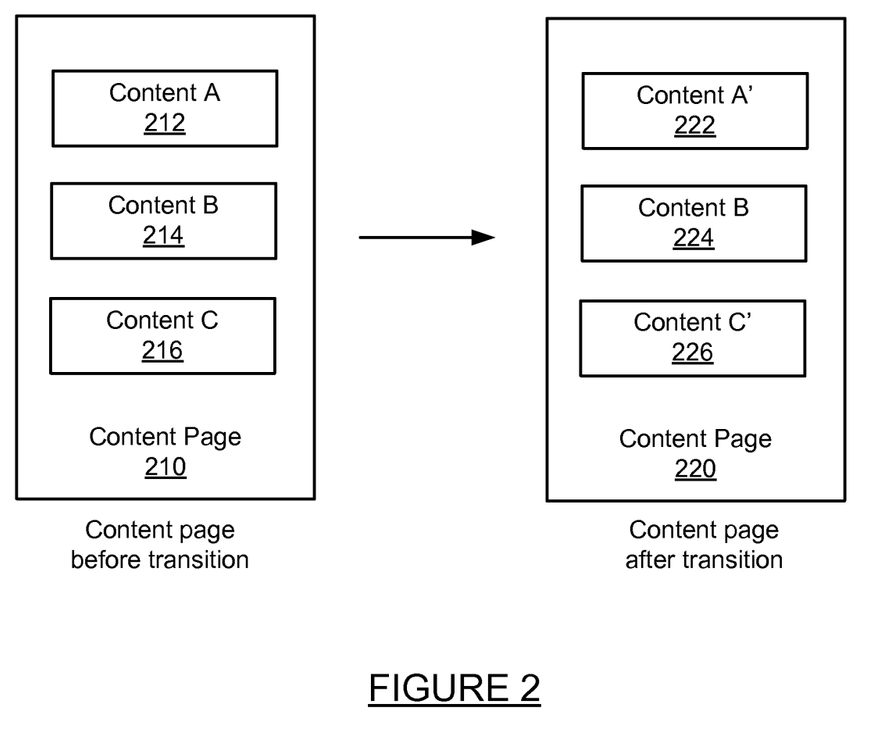
FIG. 2 illustrates a transition of a content page.

FIG. 2 illustrates a transition of a content page. The first content page version 210 may include content A, content B, and content C. When the first content page 210 experiences a transition, only a portion of the content changes within the content page—a new content page is not loaded. Hence, there is no onload event provided by a network browser or any other event that signifies that a new content page is being loaded. After a transition, content page 220 may have content in portions of the content page that differ from the content page 210. For example, content A may become content A' and content C may become content C'.

Figure 3:
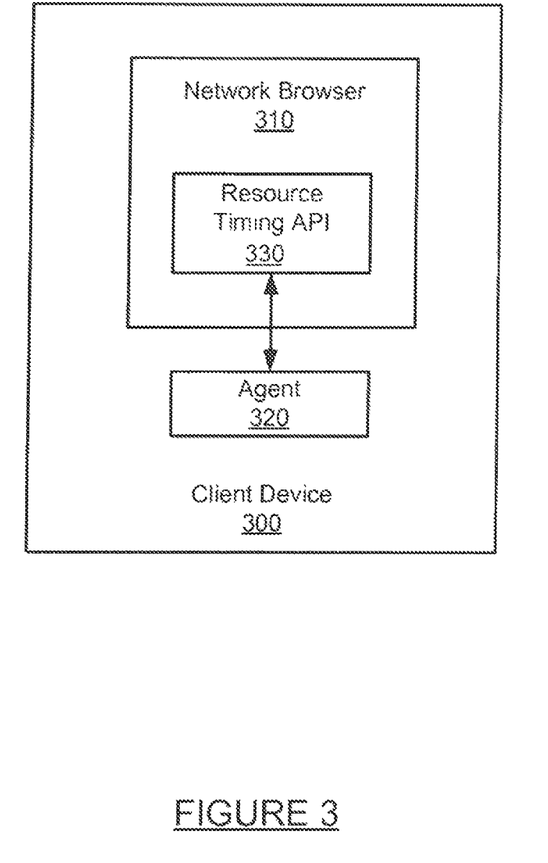
FIG. 3 illustrates a block diagram of a client device.

FIG. 3 illustrates a block diagram of a client device. Client device 300 of FIG. 3 may include network browser 310 and agent 320. Network browser 310 may include a mechanism for viewing network traffic that occurs for network browser 310. In some instances, the network browser 310 mechanism that provides the network traffic visibility may include a resource timing API 330. Resource timing API 330 may provide access to network traffic associated with the network browser. In some instances, agent 320 may access resource timing API 330 to view network traffic handled by the network browser. When a single page transition occurs, such that a portion of a content page is uploaded with new content, the new content will likely come from a remote source through network traffic. Agent 320 may view information about the network traffic providing the new content through resource timing API 330. Viewing network traffic for network browser by agent 320 is discussed in more detail below with respect to the method of FIGS. 4 and 5.

Figure 4:
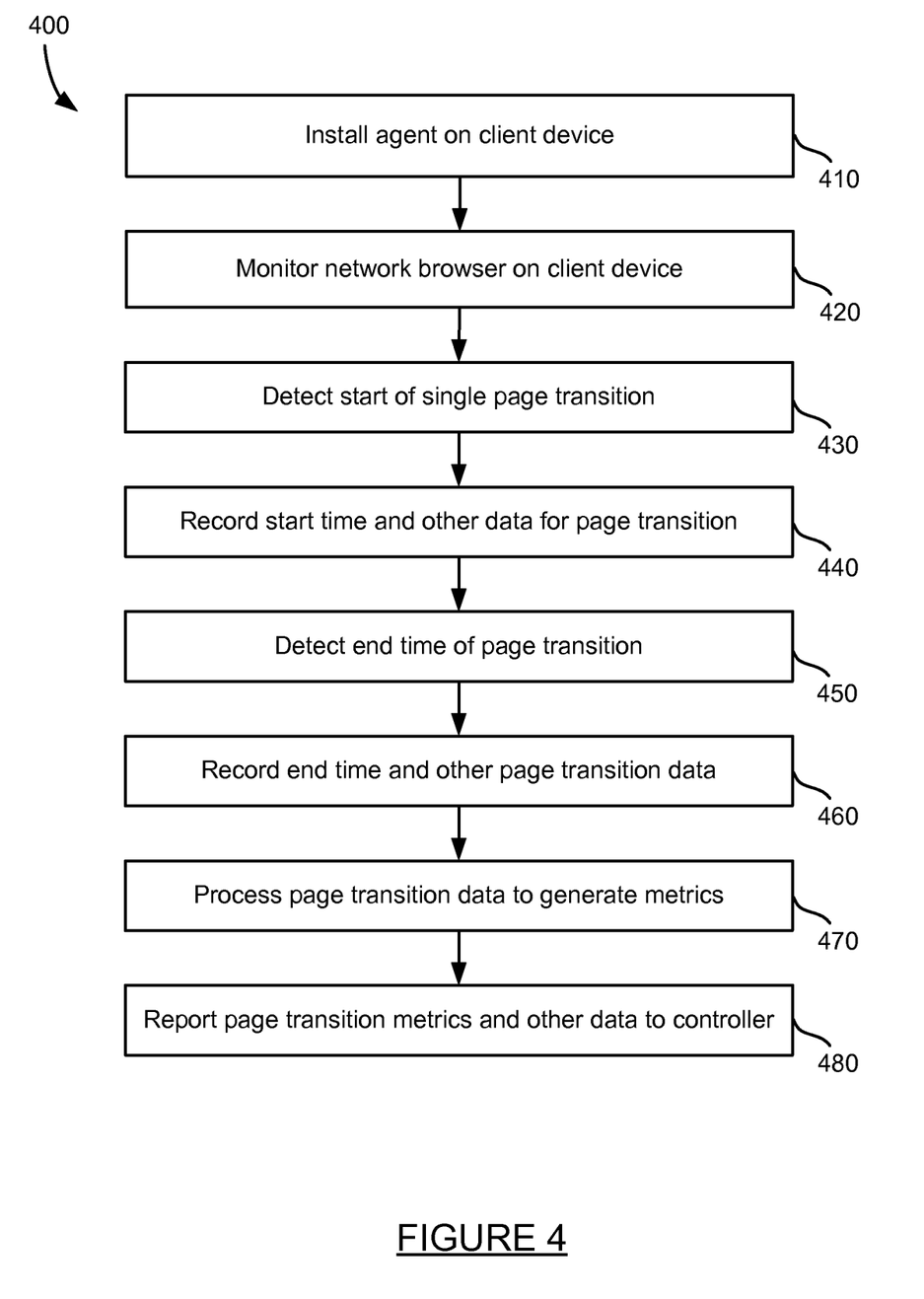
FIG. 4 illustrates a method for monitoring a single content page transition.

FIG. 4 illustrates a method for monitoring a single content page transition. First, an agent is installed on a client device at step 410. The agent may be installed by downloading the agent via a bootstrapper or some other method of installation. The network browser on the client device may be monitored at step 420.

In some instances, when an agent monitors a network browser on the client device, it may listen for events created by the browser that relate to activity to be monitored. The start of a single page transition is detected at step 430. The single page transition start may be detected when an event associated with a page transition for a content page is detected by the agent. The event is not associated with a page reload, but merely associated with a transition that involves updating or replacing a portion of the content page. The event or the page transition may be triggered by receiving user input, such as a click or other input, an event initiated by the network browser, or some other event.

The start time and other data for the page transition may be recorded at step 440. The recorded data may include the start time, the page URL, data being requested by the page, and other data. The end time of the page transition may then be detected at step 450. The end time is the time at which the page transition is complete and the content associated with the transition has been completely loaded into the page. In some implementations, when the agent is monitoring network traffic of the network browser, the end time of the page transition may be detected when the selected network traffic being monitored by the agent is no longer present. More details for to detecting the end time of a page transition are discussed with respect to the method of FIG. 5.

The end time and other page transition data are recorded at step 460. The recorded data may include the end time, the page itself, a business transaction identifier associated with the update to the page, and other data. Page transition data may then be processed, for example to generate metrics, at step 470. As data is collected over a period of time, the data may be aggregated, rolled up into metrics, and stored by the agent at the client device. The metrics may include average response time maximum response time minimum response time for the particular page transition, and other metrics. Page transition metrics and other data may then be reported to a controller at step 480. The reporting may be performed periodically, in response to a controller request, or based on some other event.

Figure 5:
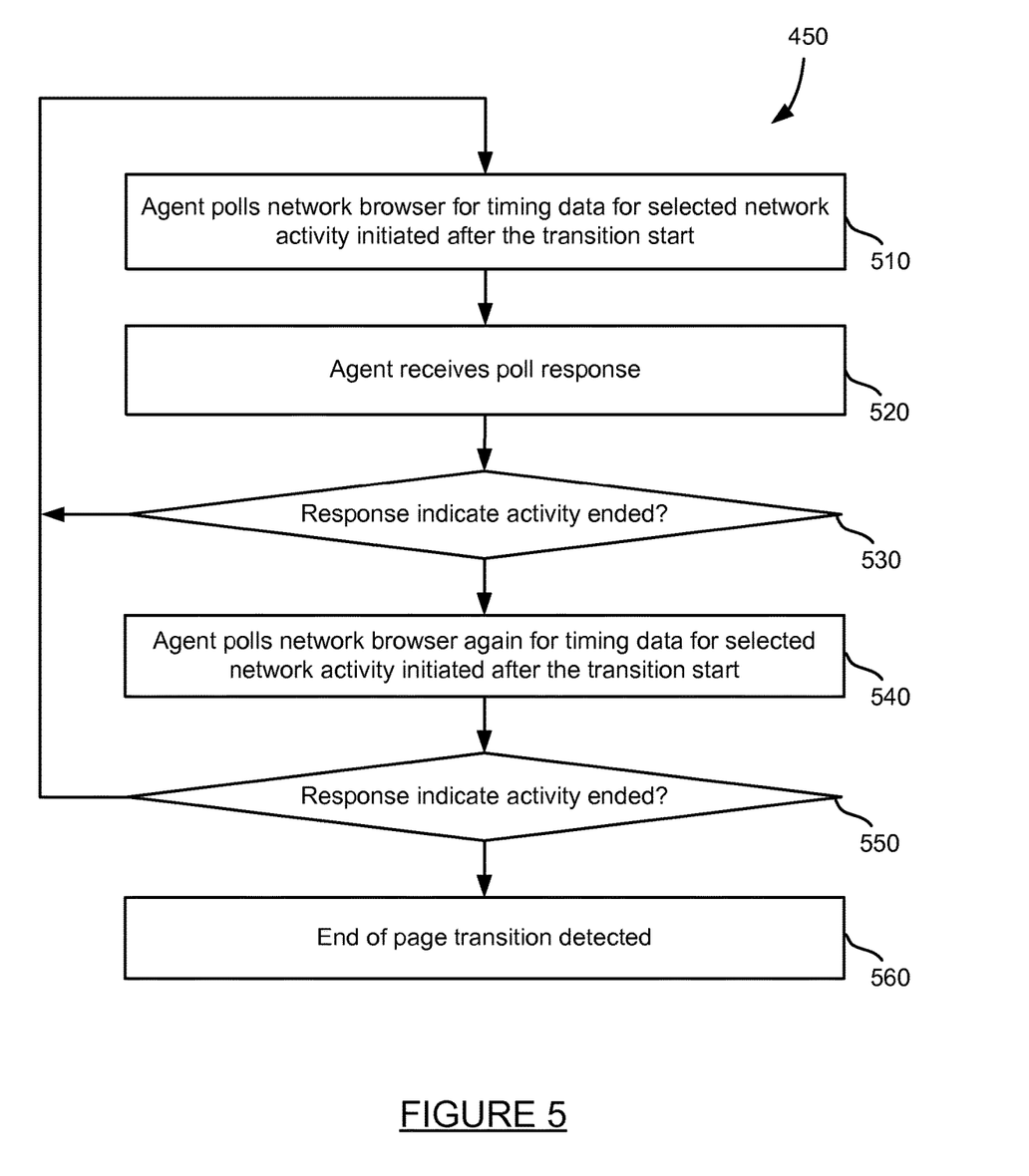
FIG. 5 illustrates a method for detecting an end time of a page transition

FIG. 5 is a method for detecting an end time of a page transition. First, an agent may poll a network browser for timing data for selected network activity and/or resources that is initiated after the transition start at step 510. The timing data may simply be an indication as to whether the particular network activity is ongoing or has completed. The network activity monitored by an agent may be a subset of the network activity types that are considered to be relevant to a content page transition. For example, relevant network activity for a single page transition may include network traffic associated with the loading of an image, a cascade style sheet (CSS), and scripts. The activity types selected to be monitored may include additional types of activity and/or less activity in addition to these types. Of the selected network activity types, only the instances that started after the detected start of the page transition are monitored. Instances of network activity types that began before the content page transition are not relevant to the performance of the content page transition.

An agent receives a poll response at step 520. The response received from the poll sent at step 510 is analyzed to determine if the response indicates that the selected network activity being monitored has ended at step 530. If the response indicates that the network activity has not completed, then the content page transition is not complete and the method of FIG. 5 returns to step 510. If the poll response indicates there is no activity for the selected network activity types, a second poll is sent to the network browser for timing data associated with the selected network activity initiated after the transition start at step 540. The second poll is to confirm that the network traffic associated with the transition of the content page has truly completed. If the response to the second poll indicates that activity has completed at step 550, then the transition end has occurred at step 560. At this point, it is determined that the transition has ended and collection of the selected network activity may stop for this particular transition. If the response to the second poll indicates that there is still activity, then the method of FIG. 5 returns to step 510 to conduct another poll.

In some implementations, characteristics other than network activity may be used to detect the start or stop of a content page transition. If the document object model (DOM) state suggests that a content page transition has begun or a content page transition has ended, that data may be used in conjunction with detected events or responses from a poll to detect the start and end of a content page transition. For example, to detect the end of a content page transition, the end may be detected if two consecutive polls resulting indicate no network activity has occurred or if a single pole indicates no network activity in combination with a DOM state indicating that a transition of a content page has completed.

In some implementations, AJAX requests may also be monitored to determine the end of a content page transition. AJAX requests may be monitored by intercepting the AJAX related APIs. The only AJAX requests that are monitored are those that are sent after the transition start time. When the AJAX requests sent after the start of the content page transition are complete, the content page transition may be complete as well.

Figure 6:
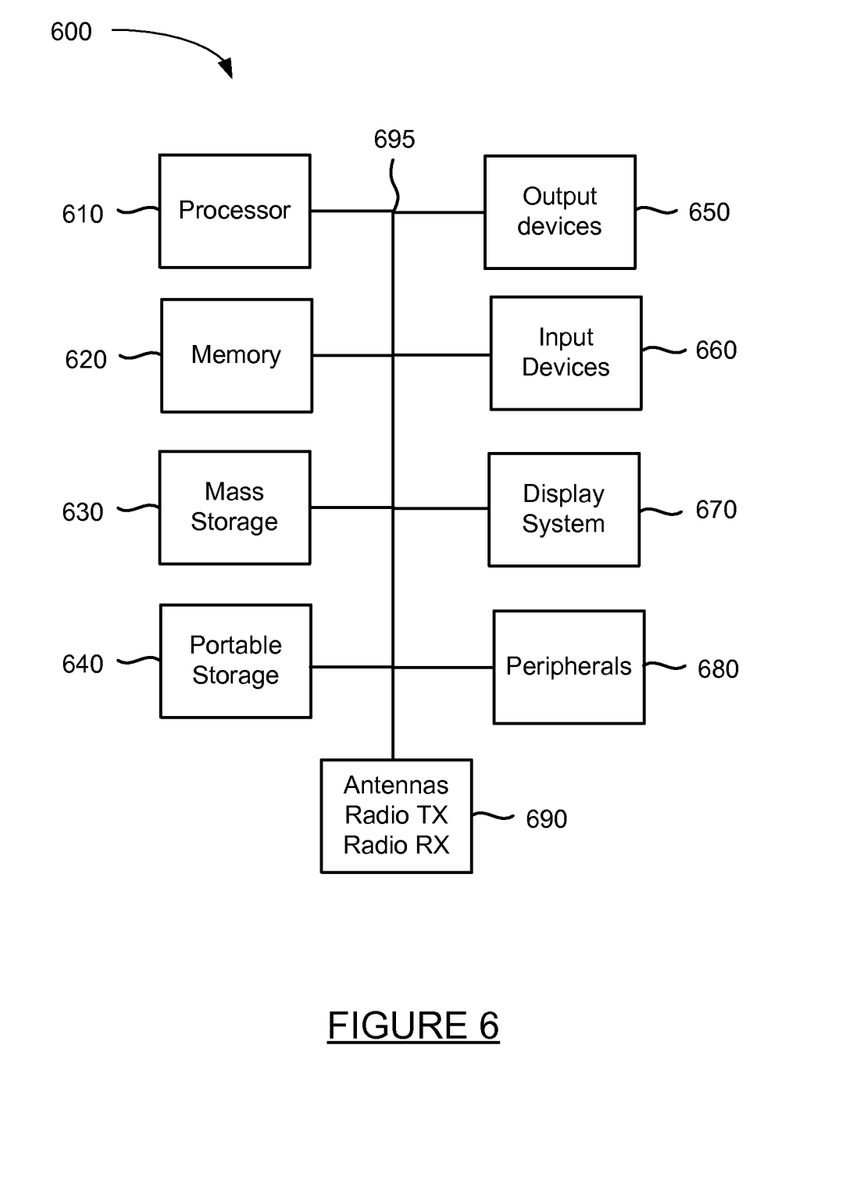
FIG. 6 illustrates a block diagram of a computing environment for implementing the present technology

FIG. 6 is a block diagram of a system for implementing the present technology. System 600 of FIG. 6 may be implemented in the contexts of the likes of client computer 105 and 192, servers 125, 130, 140, 150, and 160, machine 170, data stores 180 and 190, and controller 190. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive, an optical disk drive, a flash drive, or other device, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, USB drive, memory card or stick, or other portable or removable memory, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device. Display system 670 may also receive input as a touch-screen.

Peripherals 680 may include any type of computer support device to add additional functionality to the computer system. For example, peripheral device(s) 680 may include a modem or a router, printer, and other device.

The system of 600 may also include, in some implementations, antennas, radio transmitters and radio receivers 690. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a single content page application, comprising:
   detecting, by an agent at a client device, a start of a partial page transition for a single content page provided by a remote application, the single content page application providing a single content page in a network browser and performing subsequent updates to the single content page without loading a new page;
   in response to detecting the start of the partial page transition, monitoring, by the agent, network traffic associated with the partial page transition through an application programming interface (API) provided by the network browser until an end of the partial page transition is detected;
   detecting, by the agent, the end of the partial page transition by determining that the network traffic associated with the partial page transition has concluded, wherein detecting the end of the partial page transition includes determining that a subset of network activity types associated with the network traffic has stopped, wherein a network browser is polled for timing data associated the subset of network activity types once the partial page transition has initiated;
   in response to detecting the end of the partial page transition, recording, by the agent, the detected end time of the partial page transition and partial page transition data associated with the monitored network traffic;
   generating, by the agent, metrics based on the detected end time of the partial page transition and partial page transition data, the metrics including a response time metric for the partial page transition; and
   reporting, by the agent, the metrics to a remote server.

2. The method of claim 1, wherein the partial page transition start is detected by detecting an event triggered by the network browser, the event associated with the partial page transition for the single content page.

3. The method of claim 1, wherein the API is a resource timing API.

4. The method of claim 1, wherein the network traffic includes traffic associated with an image, a script, or a cascade style sheet associated with the partial page transition of the single content page.

5. The method of claim 1, wherein the network traffic is initiated at or after the time at which the partial page transition started.

6. The method of claim 1, wherein the monitoring includes monitoring resource usage associated with the partial page transition of the single content page.

7. A non-transitory computer readable storage medium having embodied thereon a program, the program being executable by a processor to perform a method for monitoring a single content page application, the method comprising:
   detecting, by an agent at a client device, a start of a partial page transition for a single content page provided by a remote application, the single content page application providing a single content page in a network browser and performing subsequent updates to the single content page without loading a new page;
   in response to detecting the start of the partial page transition, monitoring, by the agent, network traffic associated with the partial page transition through an application programming interface (API) provided by the network browser until an end of the partial page transition is detected;
   detecting, by the agent, the end of the partial page transition by determining that the network traffic associated with the partial page transition has concluded, wherein detecting the end of the partial page transition includes determining that a subset of network activity types associated with the network traffic has stopped, wherein a network browser is polled for timing data associated the subset of network activity types once the partial page transition has initiated;
   in response to detecting the end of the partial page transition, recording, by the agent, the detected end time of the partial page transition and partial page transition data associated with the monitored network traffic;
   generating, by the agent, metrics based on the detected end time of the partial page transition and partial page transition data, the metrics including a response time metric for the partial page transition; and
   reporting, by the agent, the metrics to a remote server.

8. The non-transitory computer readable storage medium of claim 7, wherein the partial page transition start is detected by detecting an event triggered by the network browser, the event associated with the partial page transition for the single content page.

9. The non-transitory computer readable storage medium of claim 7, wherein the API is a resource timing API.

10. The non-transitory computer readable storage medium of claim 7, wherein the network traffic includes traffic associated with an image, a script, or a cascade style sheet associated with the partial page transition of the single content page.

11. The non-transitory computer readable storage medium of claim 7, wherein the network traffic is initiated at or after the time at which the partial page transition started.

12. The non-transitory computer readable storage medium of claim 7, the monitoring includes monitoring resource usage associated with the partial page transition of the single content page.

13. A system for monitoring a single content page application, comprising:
   a client device including a memory and a processor; and
   one or more modules stored in the memory and executed by the processor, the one or more modules including an agent configured to:
      detect a start of a partial page transition for a single content page provided by a remote application, the single content page application providing a single content page in a network browser and performing subsequent updates to the single content page without loading a new page,
      in response to detecting the start of the partial page transaction, monitor network traffic associated with the partial page transition through an application programming interface (API) provided by the network browser until an end of the partial page transition is detected,
      detect the end of the partial page transition by determining that the network traffic associated with the partial page transition has concluded, wherein detecting the end of the partial page transition includes determining that a subset of network activity types associated with the network traffic has stopped, wherein a network browser is polled for timing data associated the subset of network activity types once the partial page transition has initiated, in response to detecting the end of the page transition, record the detected end time of the partial page transition and partial page transition data associated with the monitored network traffic, generate metrics based on the detected end time of the partial page transition and partial page transition data, the metrics including a response time metric for the partial page transition, and report the metrics to a remote server.

14. The system of claim 13, wherein the partial page transition start is detected by detecting an event triggered by the network browser, the event associated with the partial page transition for the single content page.

15. The system of claim 13, wherein the API is a resource timing API.

16. The system of claim 13, wherein the network traffic includes traffic associated with an image, a script, or a cascade style sheet associated with the partial page transition of the single content page.

17. The system of claim 13, wherein the network traffic is initiated at or after the time at which the partial page transition started.

18. The system of claim 13, wherein the monitoring includes monitoring resource usage associated with the partial page transition of the single content page.

* * * * *